United States Patent [19]

Buckley

[11] 4,331,230
[45] May 25, 1982

[54] WORK RACK FOR CONVEYING APPARATUS

[75] Inventor: Edward Z. Buckley, West Bloomfield, Mich.

[73] Assignee: Hooker Chemicals & Plastics Corp., Warren, Mich.

[21] Appl. No.: 51,537

[22] Filed: Jun. 25, 1979

[51] Int. Cl.³ .............................................. B65G 49/04
[52] U.S. Cl. ..................................... 198/484; 198/342; 198/802; 118/425; 134/83; 134/135; 414/592; 414/655; 414/656; 414/331
[58] Field of Search ............... 198/342, 482, 796, 802, 198/484; 118/425; 414/222, 331, 377, 381–382, 386, 390, 398, 400, 592, 654–656; 134/77, 83, 164, 160, 135; 211/41, 119

[56] References Cited

U.S. PATENT DOCUMENTS

| | | | |
|---|---|---|---|
| 1,249,286 | 12/1917 | Stone | 198/342 X |
| 1,382,144 | 6/1921 | Taylor | 198/342 |
| 2,512,643 | 6/1950 | Hannon | 134/77 X |
| 2,741,252 | 4/1956 | Davis | 134/160 X |
| 2,831,454 | 4/1958 | Kearney | 198/342 X |
| 3,472,203 | 10/1969 | Coleman | 118/425 |

FOREIGN PATENT DOCUMENTS

| | | | |
|---|---|---|---|
| 630204 | 12/1961 | Italy | 134/77 |
| 873618 | 7/1961 | United Kingdom | 198/342 |
| 448992 | 4/1975 | U.S.S.R. | 198/342 |

Primary Examiner—Charles A. Marmor
Attorney, Agent, or Firm—Harness, Dickey & Pierce

[57] ABSTRACT

A work conveying apparatus for transporting work pieces through a plurality of treating stations including a work rack for supporting the work pieces which is tiltable, according to one embodiment of the invention, in one direction when in a raised position to facilitate drainage of solution from the work pieces and is tiltable in an opposite direction to facilitate escape of gases from the work pieces when the work rack is immersed in a treating solution. The work rack further includes pivotally mounted work holders thereon which are movable to and from a work piece supporting position to a work piece discharge or unloading position to facilitate automatic loading and unloading of work pieces therefrom. The conveying apparatus further includes an unload station including a guide for retaining the work rack in a fixed position and includes a device for aligning the rack with the guide during its descending movement. An actuator associated with the guide for pivoting the work holders to the unload position to effect automatic unloading of the work pieces therefrom.

11 Claims, 15 Drawing Figures

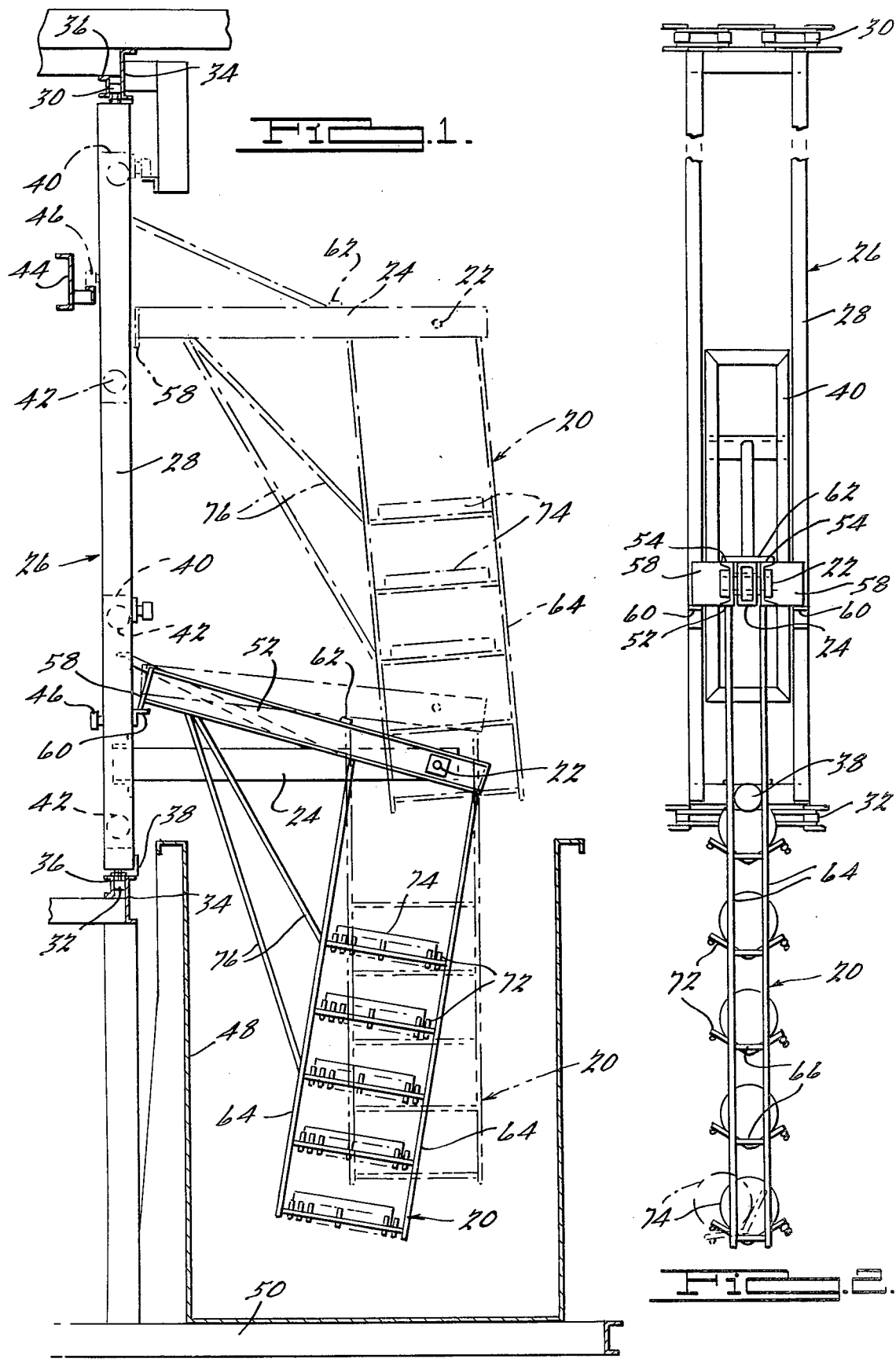

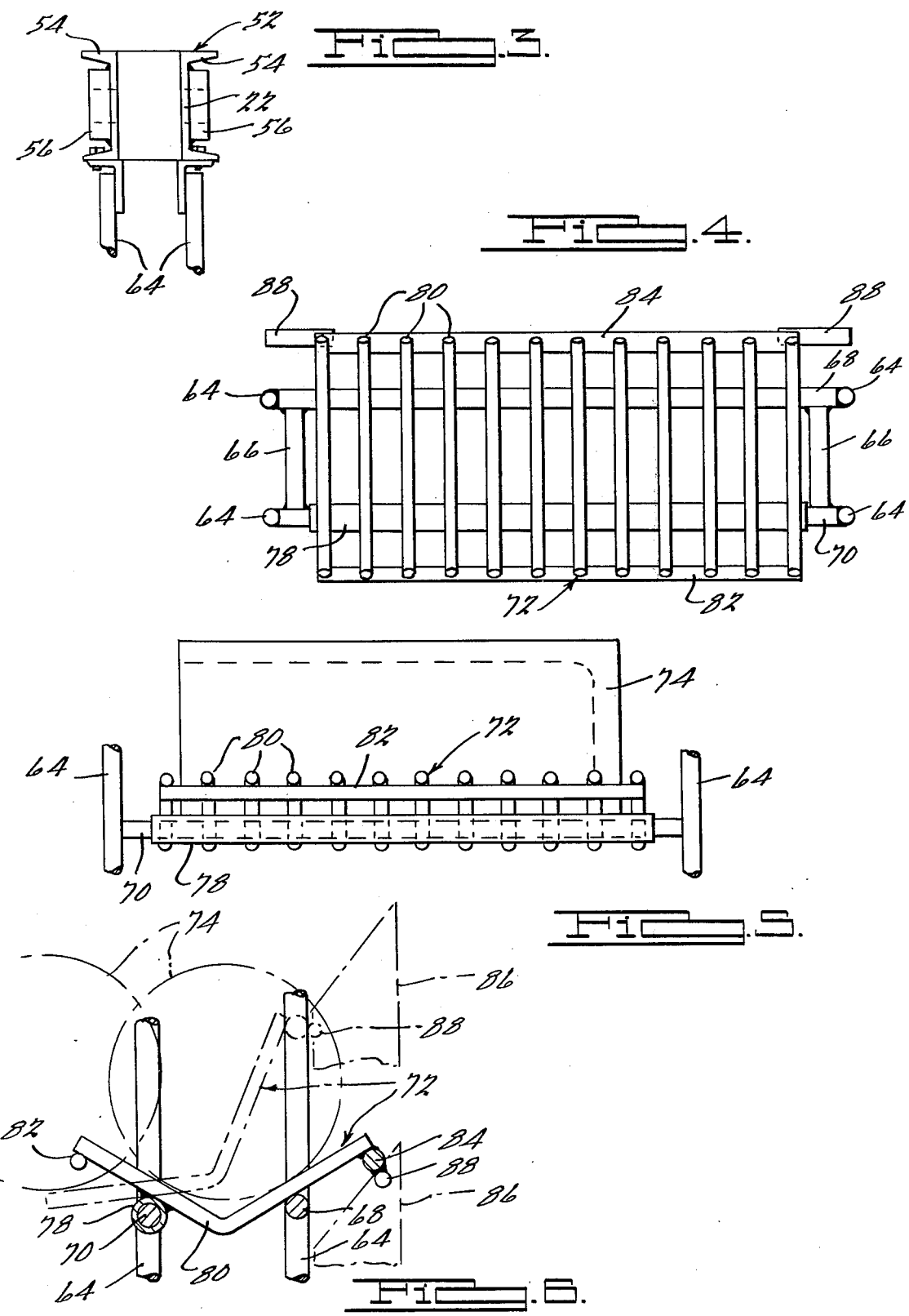

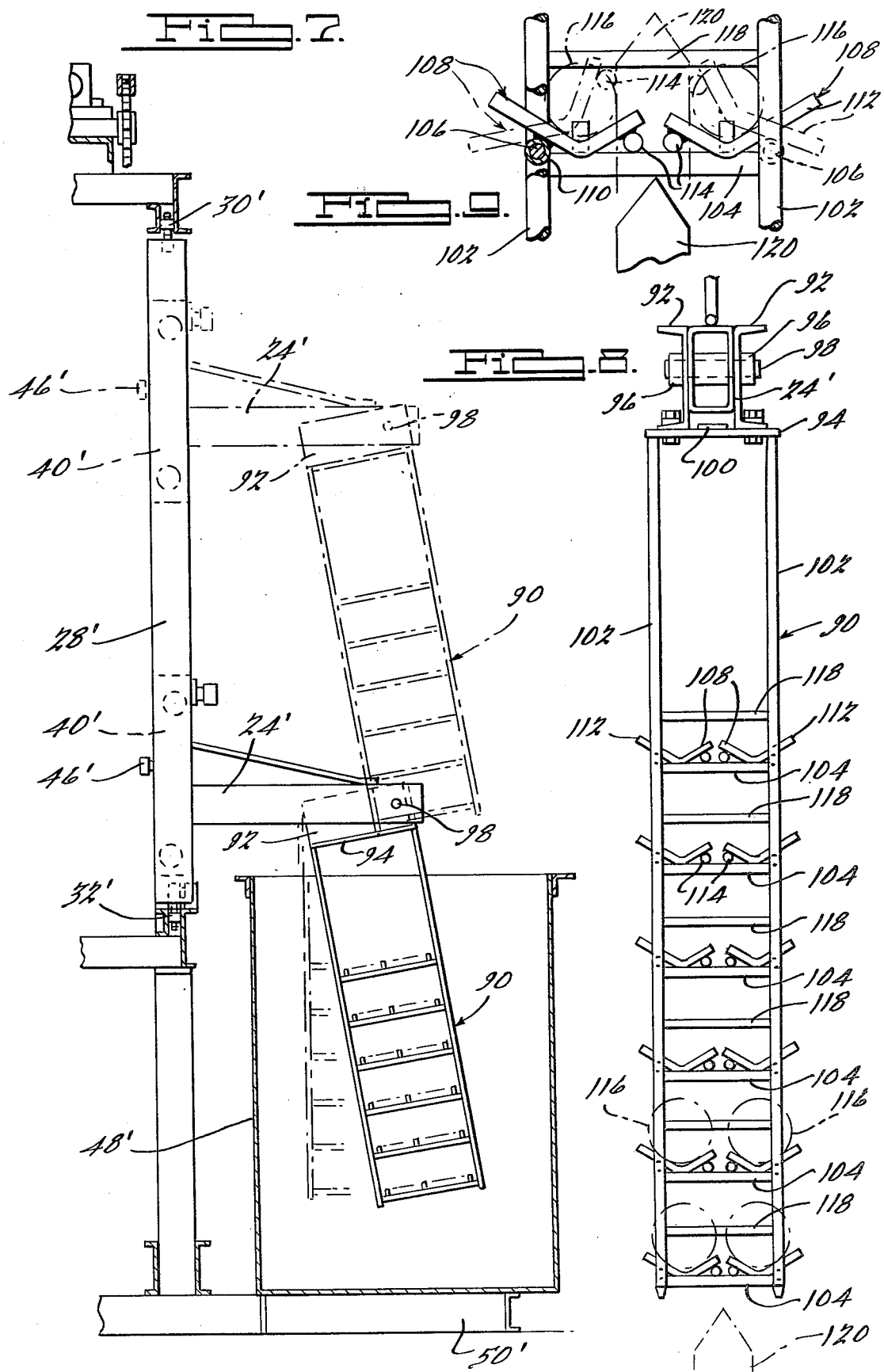

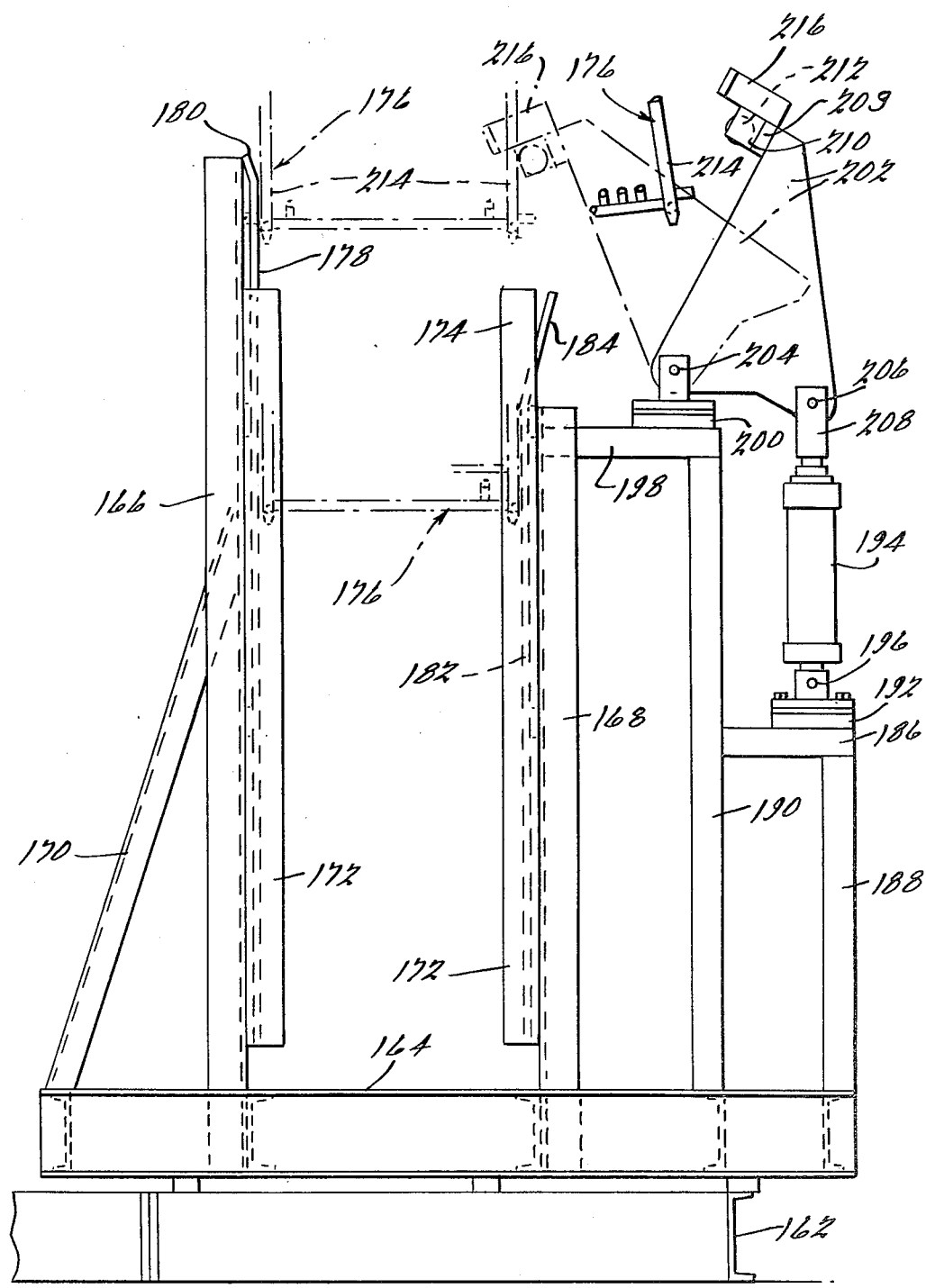

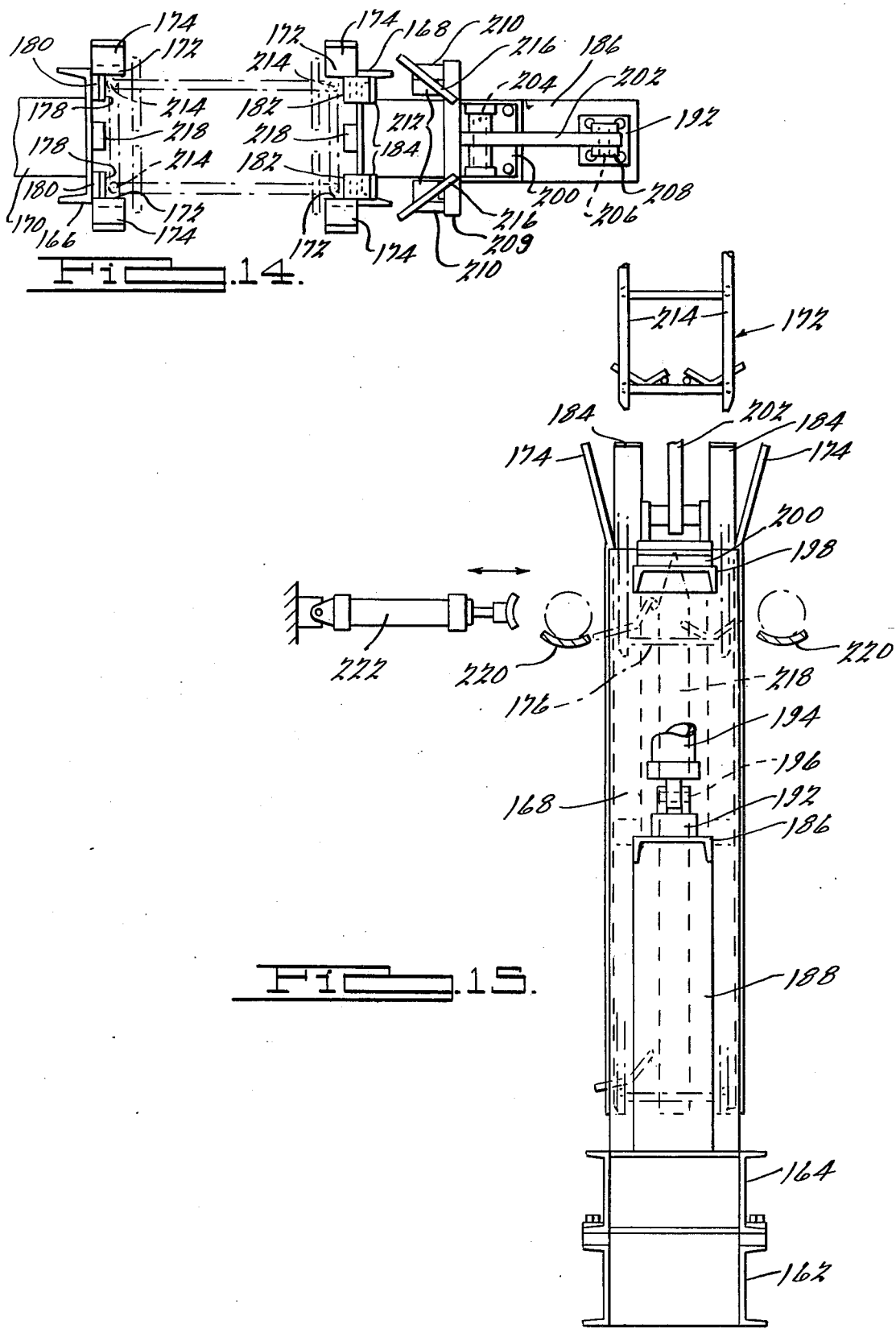

WORK RACK FOR CONVEYING APPARATUS

BACKGROUND OF THE INVENTION

The present invention broadly relates to conveying apparatuses of the general type used for automatically conveying work pieces through a series of work stations including treating stations so as to perform a preselected treatment of the work pieces. More particularly, the present invention is directed to an improved work rack mounted on a supporting member which is transportable by any one of a variety of conveying devices through a series of treating stations whereby the work pieces thereon are subjected to a sequential chemical, electro-chemical, electroplating, or the like process.

A variety of work racks have heretofore been used or proposed for use in supporting individual or a plurality of work pieces to facilitate their handling and transport through the processing sequence. It has heretofore been conventional practice to manually load the work pieces on the work rack at a load station and to subsequently manually unload the treated work pieces at an unload station at the completion of the treating process. The manual loading and unloading operation is usually labor intensive, time consuming and detracts from the overall efficiency of the treating process. In some instances, the heavy weight of the individual work pieces further complicates the manual loading and unloading operation.

Additional problems associated with work rack designs of the types heretofore known has been their relatively rigid structure such that the work pieces are retained in a fixed position thereon throughout their transport through the several work stations. In the case of certain tubular and cup-shaped work pieces, it is desirable to support such work pieces at a position inclined from the horizontal to facilitate drainage of treating solutions from the interior thereof after they are withdrawn from the treating solution to minimize solution drag-out and contamination of the treating solutions. In the case of cup-shaped work pieces or work pieces of a hollow configuration having a closed end, it is further desirable to orient such work pieces with the open end disposed upwardly while immersed in a liquid treating solution to facilitate liquid contact with the interior surfaces thereof and to further permit escape of air and gaseous reaction products that may form during the treatment. Work racks of the various types heretofore known have been deficient in their design to facilitate an automatic loading and unloading of work pieces therefrom as well as in their ability to support work pieces in a multitude of angularly disposed positions to facilitate treatment and drainage of liquid treating solutions therefrom.

The present invention overcomes the problems and disadvantages associated with prior art work rack constructions by providing a simple, durable and versatile construction which is readily adaptable for automatic loading and unloading of work pieces therefrom and which also is tiltable to angularly position the work pieces in a multitide of angular positions at various stages of the treating cycle facilitating efficient treatment of the surfaces thereof as well as drainage of the treating solutions therefrom.

SUMMARY OF THE INVENTION

The benefits and advantages of the present invention are achieved by an improved work rack adapted to be secured to a supporting member which is transportable by suitable conveying apparatuses between a plurality of work stations and which is movable to and from a raised position and a lowered position above at least certain of the treating stations. In accordance with one embodiment of the present invention, each work rack incorporates a plurality of pivotal work holders mounted on the work rack frame which are pivotal to and from a first position for supporting a work piece thereon to a second position for discharging a work piece therefrom. Suitable biasing means are provided for normally urging each work holder toward the first work supporting position and coacting means are provided at one station such as an unload station for engaging and pivoting the work holders toward the second position for discharging treated work pieces therefrom. In accordance with a preferred embodiment, each work holder comprises a foraminous tray extending between supporting side members of the work rack and which include coacting stop means for limiting the pivoting movement of the work holder beyond the first work supporting position and beyond the second work discharge position.

In accordance with a further embodiment of the present invention, each work rack includes a frame which is pivotally suspended from the supporting member at a position offset from the center of gravity of the work rack assembly to cause tilting movement of the rack when disposed in one vertical position toward a first tilted position in which the work holders and the work pieces supported thereon are angularly inclined from the horizontal in one direction. Additionally, coacting means are provided at a work station for engaging the frame when the work rack is in a different vertically spaced position in order to angularly tilt the rack to a second tilted position and in a direction opposite to that of the first position. A framework is further provided at a load and unload station including a guide for receiving the work rack to maintain the rack in a relatively vertically oriented position and further including means for engaging the rack framework to effect a tilting thereof so as to be disposed in vertical alignment with the guide. Coacting means are further associated with the guide for engaging the pivotally mounted work holders thereon for tilting the work holders to a discharge position in response to the descending movement of the work rack effecting an automatic unloading of the work rack. A suitable work piece conveyer and load mechanism is provided at a loading station for transferring work pieces to be processed from the conveyor in supporting relationship on the work holders of a work rack.

Additional benefits and advantages of the present invention will become apparent upon a reading of the description of the preferred embodiments taken in conjunction with the accompanying drawings.

BRIEF DESCRIPTION OF THE DRAWINGS

FIG. 1 is a fragmentary side elevational view of an improved work rack constructed in accordance with the preferred embodiment of the present invention pivotally supported on a supporting member of a side-arm-type conveying machine;

FIG. 2 is a fragmentary front elevational view of the work rack and conveying apparatus illustrated in FIG. 1;

FIG. 3 is a magnified fragmentary front elevational view of the upper portion of the frame of the work rack shown in FIGS. 1 and 2;

FIG. 4 is a magnified plan view of a work holder on the work rack shown in FIGS. 1 and 2;

FIG. 5 is a side elevational view of the work holder shown in FIG. 4;

FIG. 6 is a magnified fragmentary side elevational view partly in section and partly in phantom illustrating the pivoting motion of the work holder shown in FIGS. 4 and 5;

FIG. 7 is a fragmentary side elevational view similar to FIG. 1 and illustrating an improved work rack in accordance with an alternative embodiment of the present invention;

FIG. 8 is a front elevational view of the work rack shown in FIG. 7;

FIG. 9 is a magnified fragmentary side elevational view partly in section and partly in phantom illustrating the pivoting movement of the work supporting holders to and from a work supporting position and a work discharge position;

FIG. 13 is a side elevational view of an unload mechanism and guide structure for automatically unloading work pieces from a work rack;

FIG. 14 is a fragmentary plan view of the unload structure shown in FIG. 13 and

FIG. 15 is an end elevational view of the unload mechanism illustrated in FIG. 13.

DESCRIPTION OF THE PREFERRED EMBODIMENTS

Figure 10:
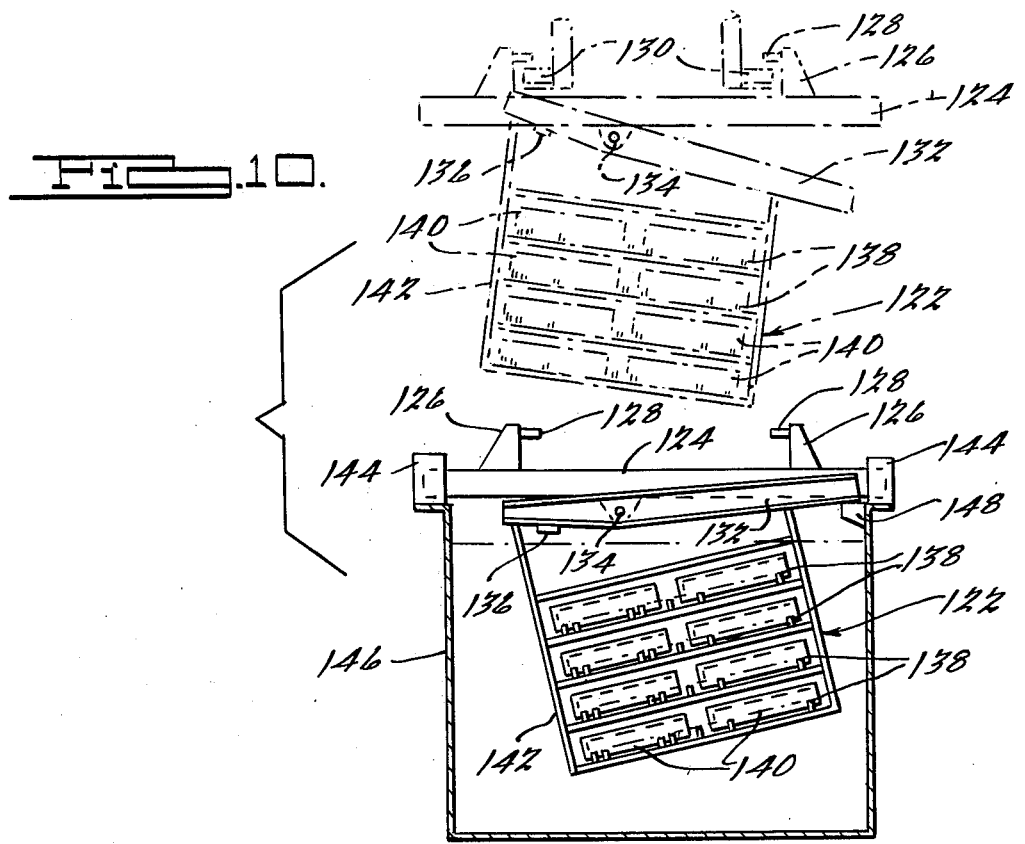
FIG. 10 is a side elevational view, partly schematic, of an improved work rack pivotally suspended from a supporting member comprising a work bar.

Referring now in detail to the drawings and as may be best seen in FIGS. 1-6 thereof, an improved work rack in accordance with one embodiment of the present invention is illustrated which is tiltable in different elevated positions thereof and further embodies pivotally mounted work holders for discharging processed work pieces therefrom at a suitable unload station. The work rack assembly indicated at 20 is pivotally suspended by means of a pin 22 from a supporting member 24 comprising an arm of a side-arm-type conveying machine 26 as fragmentarily shown in FIGS. 1 and 2. It will be understood that the improved work rack assembly is adaptable for mounting on a supporting member which is transportable by any one of a variety of conveying apparatuses of the types heretofore known of which the side-arm machine as illustrated is typical.

In the specific arrangement illustrated in FIGS. 1 and 2, the side-arm machine may comprise any of the types such as generally disclosed in U.S. Pat. Nos. 2,945,579; 3,311,214; 3,331,518; 3,504,812; 3,674,127; 3,760,927 or 3,770,150, to which reference is made for further details of such conveying apparatuses and the substance of which are incorporated herein by reference. Side-arm conveying machines of the aforementioned type and as illustrated in FIGS. 1 and 2, comprise a plurality of rectangular carriage frames 28 connected at spaced intervals along their upper and lower ends to roller chains 30, 32 which are guidably disposed within a track defined by an outer channel member 34 and an inner channel member 36 incorporated in the machine framework. The lower portion of the carriage frame 28 is provided with a roller 38 which is disposed in rolling supporting contact on the upper flange of the outer channel members 34.

Conventionally, the framework of the conveying machine is arranged so as to provide for two straight side sections interconnected at their respective ends by an arcuate turn around section defining a continuous loop. The roller chains 30, 32 are trained around one or more suitable sprockets rotatably mounted along the arcuate end sections and are connected to suitable drive means (not shown) for intermittently advancing the roller chains and the carriage frames connected thereto from one station to the next adjacent station.

A carriage assembly including a rectangular frame 40 is supported between the side members of the carriage frame 28 by means of rollers 42 for up and down movement between a lowered position as shown in solid lines in FIG. 1 to an elevated position as shown in phantom. Movement of the carriage assembly including its laterally extending supporting arm 24 between the raised and lowered position is achieved by an elevator chassis fragmentarily indicated at 44 mounted inwardly of the carriage frame 28 and adapted to coact with a lifting roller 46 projecting rearwardly of each carriage assembly. Movement of the elevator chassis between the raised and lowered position can conveniently be achieved by a fluid actuated cylinder in accordance with the various arrangements disclosed in the aforementioned U.S. patents.

A plurality of work stations are disposed at spaced intervals along the longitudinal path of travel of each work carrier and include a treating receptacle or tank 48 at certain of such stations as illustrated in FIG. 1 which are supported on a base 50 of the conveying machine framework. Such treating tanks are conveniently filled with a suitable treating fluid or solution in which work pieces supported on the work rack assembly are adapted to be immersed to effect an appropriate treatment thereof. The work rack assembly can be retained in the fully lowered position as shown in solid lines in FIG. 1 in a multiple station treating tank and ultimately is raised to the elevated position as shown in phantom to permit transfer thereof above the partitions separating adjoining treating receptacles.

The work rack assembly 20 in accordance with the arrangement illustrated in FIGS. 1-6 comprises a frame 52 consisting of a pair of spaced channel members 54 incorporating a pair of bearing blocks 56 as shown in FIG. 3 through which the pin 22 extends for pivotally suspending the rack assembly from the supporting member 24. The opposed faces of the channel members 54 overlie the side faces of the supporting member 24 for guided tilting movement relative thereto. The inner or left hand end of each of the channel members 54 are connected to a plate 58 disposed adjacent to the carriage frame 28 and which are adapted to coact with stop members 60 affixed to the outer face of the carriage frame for effecting a tilting movement of the work rack assembly in response to its descending movement from a raised position as shown in phantom in FIG. 1 to a fully lowered position. The channel members 54 are further connected by means of a stop plate 62 affixed across the upper edges thereof which is adapted to overlie and engage the upper surface of the supporting member 24 preventing tilting movement of the work rack assembly beyond the tilted position as shown in phantom when in a fully raised position.

An elongated frame is rigidly secured to and depends from the underside of the channel members comprising two pairs of side members 64, each pair of which is securely connected to horizontal side members 66 at vertically spaced intervals therealong forming a ladder-type frame which in turn are secured in spaced substantially parallel relationship by cross members 68, 70. A work holder in the form of a foraminous V-shaped tray 72 extends transversely of the side members 64 and is pivotally supported on the cross members 70.

The upper ends of the two pairs of side members 64 defining the box-like framework of the work rack are secured to the underside of the channel members 54 to orient the depending framework at an angle from the vertical, such as an angle of 5 degrees, for example, when the work rack is in an elevated position as shown in phantom in FIG. 1. The point of pivoting support by the pin 22 is located at a point laterally set off from the center of gravity of the work rack including the work pieces supported thereon to impose a torque or gravitational biasing force tending to tilt the work rack in a counter-clockwise direction as viewed in FIG. 1 in which the stop plate 62 is in engagement with the upper surface of the supporting member preventing further angular tilting beyond that point. In such position, the work holder trays 72 are angularly inclined from the horizontal such that cup-shaped work pieces, as diagrammatically indicated at 74, thereon are disposed with their open ends in a lowered position thereby facilitating drainage of any treating solution from within the interior thereof. On the other hand, as the work rack assembly is lowered by the supporting member, the plates 58 engage the stop members 60 on the carriage frames effecting a tilting movement of the work rack assembly from the elevated position shown in phantom in FIG. 1 to the lower position as shown in solid lines in which the trays 72 and the work pieces 74 thereon are inclined in an opposite direction in which the open ends thereof are disposed above their closed ends facilitating an escape of any air and reaction gases that may form within the interior of the work pieces during their treatment in a treating solution. The work rack arrangement is further adapted to be oriented in an intermediate substantially vertical position as illustrated by the lowered phantom position of FIG. 1 at a load and unload station to facilitate loading and unloading of the work pieces therefrom in a manner and for the purposes subsequently to be described. A further rigidification of the work rack framework is achieved by angularly extending braces 76 extending between the side members 64 and the channel members 54 as best seen in FIG. 1.

Referring now in detail to FIGS. 4-6, each of the work supporting trays 72 comprises a tube 78 overlying and rotatably journalled around the cross member 70 to which a plurality of V-shaped bars 80 are secured such as by welding in longitudinally spaced substantially parallel relationship. The ends of each of the V-shaped bars 80 are further rigidly secured to a rod 82 while the opposite ends are secured to a longitudinally extending rod 84. The center of the tray assembly substantially coincides with the mid-point of the pair of side members 64 and serves to cradle a cylindrical work piece when the tray is in a normal work supporting position as represented by solid lines in FIG. 6. The lateral offset of the axis of pivoting movement of the tray about the cross member 70 continuously biases the tray through the action of gravity toward the work supporting position. In that position, the legs of the V-shaped bars 80 opposite to the tube 78 rest upon and are supported by the cross member 68. Pivoting movement of the tray from the work supporting position to a work discharge position as shown in phantom in FIG. 6 can conveniently be achieved by means of a cam 86 adapted to coact with the rod 84 for effecting a pivoting movement of the tray in response to relative movement therebetween whereby the work piece rolls or slides laterally off the tray and may conveniently be received by a suitable conveyor for further handling. In order to prevent pivoting movement of the tray beyond the discharge position illustrated, a pair of stop pins 88 are affixed to and project beyond the end of the rod 84 and are adapted to engage the adjacent side members 64 as shown in phantom.

In accordance with the arrangement as illustrated in FIGS. 1-6, the work rack assembly is tiltable transversely to angularly orient the work supporting trays at one angle while in one vertically spaced position to an opposite angle when in a second vertically spaced position as well as one or more intermediate angles between including a substantially horizontal position as is desirable at the load and unload station of the apparatus. The vertical positioning of the work rack assembly and the supporting trays thereon can conveniently be achieved by means of a suitable stop (not shown) to retain the supporting member 24 in a position slightly elevated from the fully lowered position as shown in FIG. 1 whereby the plates 58 are in engagement with the stop members 60 such that the channel members 54 are angularly inclined to orient the side members and the work supporting trays in a substantially vertical and horizontal position, respectively. This intermediate elevated position is depicted in solid lines in FIG. 2 as well as in phantom in FIG. 1.

Referring now to FIGS. 7-9, an alternative embodiment of the work rack assembly is illustrated which is particularly adaptable for processing tubular work pieces which are open at each end such that the rack remains in the same tilted position while in the raised and lowered position but can be tilted in a substantially vertical position at a load-unload station to facilitate transfer of work pieces to and from the rack. The rack assembly further includes plural rows of work supporting trays which are pivotally mounted and movable between a work supporting position and a work discharge position to facilitate automatic loading and unloading thereof. In the processing of such tubular articles, the angular inclination of the work pieces from the horizontal enhances gas escape from the interior thereof during immersion in a treating liquid as well as more rapid drainage of solution from the work pieces upon their withdrawal from a treating tank. The alternative work rack assembly is again illustrated as being pivotally suspended from a side-arm-type conveying machine in which like parts have been designated by the same numerals employed in FIGS. 1 and 2 with a prime affixed thereto.

As best seen in FIG. 7, the conveying apparatus comprises a supporting member or arm 24' connected to a rectangular frame 40' of a carriage assembly guided for vertical movement in a rectangular carriage frame 28'. The carriage frame is connected at its upper and lower ends to roller chains 30' and 32' for transfer and the carriage is raised and lowered by an elevator chassis (not shown) engagable with a lift roller 46'. A treating tank 48' is supported on the machine base 50' for receiving a work rack assembly 90 constructed in accordance with the alternative embodiment.

The work rack assembly 90 comprises an elongated ladder-type box framework including a pair of spaced channel beams 92 secured to a plate 94 which define the upper portion of the rack framework. As best seen in FIG. 8, the channel beams 92 overlie the side faces of the supporting member 24' and are formed with bearing blocks 96 for receiving a pin 98 for pivotally suspending the rack assembly from the supporting member. The pin extends through the channel beam at a point laterally offset from the center thereof so that gravity induces tilting movement of the rack in a counter-clockwise direction as viewed in FIG. 7 to a normally tilted position which may conveniently be at an angle of about 5 to about 10 degrees from the vertical. A pad 100 as best seen in FIG. 8 is affixed to the upper surface of the plate 94 and is adapted to abut the underside of the supporting member forming a stop which prevents further tilting movement of the rack assembly beyond the tilted position shown in FIG. 7.

The lower work rack framework is defined by four depending corner members 102 which are securely fastened at their upper ends to the plate 94 and along the length thereof by side cross members 104 and front cross members 106. A plurality of pivotally mounted work holders in the form of a foraminous tray 108 are mounted in the form of a pair of vertically spaced rows on the framework and include a tube 110 rotatably supported around the front cross members 106 to which a plurality of V-shaped bars 112 are secured such as by welding. The opposite leg of the V-shaped bars are secured to a longitudinally extending rod 114 which is adapted to rest upon the upper surface of the side cross members 104 as best seen in FIG. 9 when the tray is in the normal work supporting position. The lateral offset position of the axis of pivoting movement of the work holders relative to the center of gravity of the work holder normally induces a biasing force through the action of gravity to retain the work holder in the work supporting position as shown in solid lines in FIG. 9.

Each of the work supporting trays is pivotable from the work supporting position in which a cylindrical work piece indicated at 116 in FIG. 9 is cradled in the V-shaped bars to a work discharge position as shown in phantom in which the leg of the V-shaped bars connected to the tube 110 is downwardly inclined causing the work piece to roll outwardly of the rack assembly effecting an unloading thereof. Pivoting movement of the work supporting tray beyond the work discharge position is prevented by the coaction between the ends of the rod 114 and the underside of an intermediate cross member 118 affixed to an extending between the side members 102 as best shown in FIG. 9.

The pivoting movement of the work supporting trays from the work supporting position to the work discharge position can be conveniently achieved by means of a cam 120 positioned at an unload station having a tapered upper end which is centrally aligned with the rack assembly and is adapted to coact with the ends of the rods 114 in response to relative vertical movement between the cam and rack. An automatic unloading of the work pieces can conveniently be achieved by advancing the work rack in an elevated position above the unload station and thereafter lowering the rack such that the cam 120 sequentially tilts the work supporting trays in response to the lowering movement thereof and the work pieces are discharged at substantially the same elevation and are received on a suitable conveyer by which they are transferred to the next work operation. It will also be appreciated that the work rack can be retained stationary and the cam 120 can be thrust upwardly through the rack such as by a suitable double-acting fluid actuated cylinder to effect a pivoting movement of the work trays. In either event, during the loading or unloading operation, the work rack assembly is preferably oriented in a substantially vertical position in which the work supporting trays and work pieces are substantially horizontal to facilitate loading and unloading of the work pieces. The vertical orientation of the work rack assembly can be achieved by a variety of devices of which the actuator and guide mechanism illustrated in FIGS. 13 and 15 comprises a preferred embodiment and will be subsequently described in detail.

Figure 11:
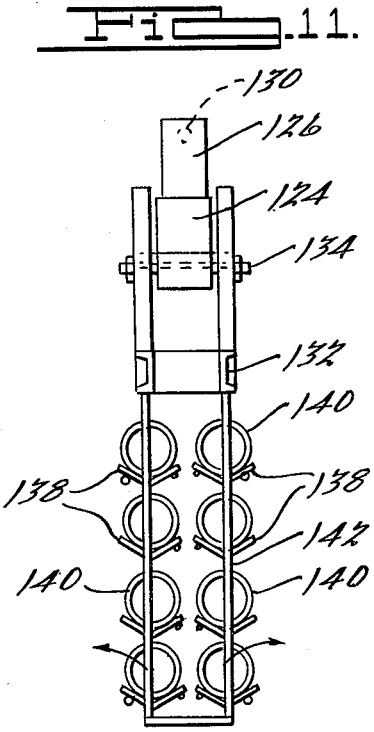
FIG. 11 is a front elevational view of the work rack and supporting member shown in FIG. 10.

The adaptability of the work rack assembly of the present invention to alternative conveying devices is schematically illustrated in FIGS. 10 and 11 in which a work rack assembly 122 is pivotally suspended from a supporting member in the form of a work bar 124. Work bars of the type illustrated are conveniently transported by various manually operated as well as automatic hoist mechanisms of which U.S. Pat. No. 3,252,603 is typical of automatic-type hoists. Further reference is made to the aforementioned United States patent for specific structural aspects and operating details which are incorporated herein by reference. The work bar 124 is in the form of a beam having members 126 secured to the upper face thereof from which lugs 128 project in opposing relationship and are adapted to be engaged by V-shaped lift members indicated in phantom at 130 in FIG. 10. The lift members are connected to any of the variety of hoist mechanisms well known in the art.

The work rack assembly 122 comprises a rectangular framework including an upper beam 132 which is pivotally secured by means of a pin 134 to a depending pad on the underside of the work bar at a position laterally offset from the center of gravity of the rack assembly so as to induce tilting movement of the rack in a clockwise direction as viewed in FIG. 10. The upper beam 132 may conveniently comprise a pair of spaced apart channel members as in the rack assemblies previously described and include a pad 136 affixed to and extending between the undersides thereof for coacting with the underside of the work bar to restrict further gravitational tilting movement of the rack assembly when in an elevated position beyond the inclination as illustrated in FIG. 10. The pad 136 is positioned such that the work supporting trays 138 and the cup-shaped work pieces 140 are angularly inclined from about 5 to 10 degrees from the horizontal when in an elevated position facilitating drainage from the interior of the work pieces.

A rectangular ladder-type box framework 142 is securely fastened to the underside of the upper beam 132 on which a plurality of the work trays 138 are pivotally mounted in the form of vertically stacked rows in an arrangement similar to that illustrated in FIGS. 8 and 9. The work trays 138 are of an elongated configuration enabling a plurality of the work pieces 140 to be positioned on each tray in end-to-end relationship.

When disposed in the lowered position at a treating station, the ends of the work bar 124 are positioned within V-shaped saddles 144 mounted adjacent to the upper edges of a treating tank 146 at an elevation such that the work pieces on the rack are immersed in the treating solution. During the descending movement of the work bar and rack assembly to the lowered position as shown in solid lines in FIG. 10, the right hand end of the upper beam 132 as viewed in FIG. 10 contacts an abutment 148 secured to the upper edge of the tank structure effecting a pivoting movement of the beam and work rack assembly to an opposite inclined position in which the open ends of the cup-shaped work pieces are oriented upwardly to permit escape of air and reaction gases. The angular inclination can generally vary of from about 10 to about 20 degrees depending upon the specific configuration of the work pieces being treated. Upon withdrawal from the treating tank, the work rack assembly again assumes the drain position upon disengagement with the abutment 148.

The work rack assembly 122 as shown in FIGS. 10 and 11 can also be disposed in an intermediate vertical position as previously described in connection with FIG. 1 and the cylindrical work pieces can be automatically unloaded from the rack in accordance with the mechanism previously described in connection with FIGS. 8 and 9.

Figure 12:
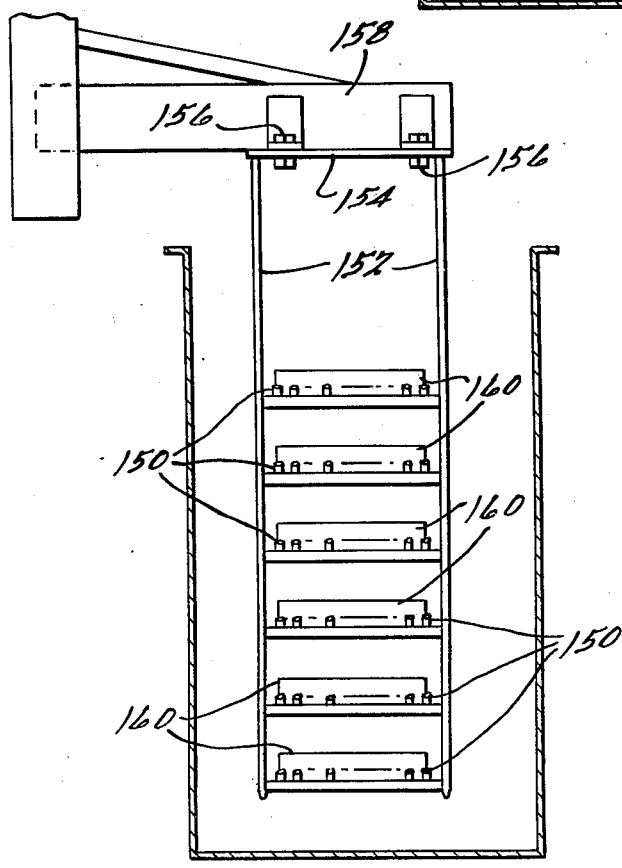
FIG. 12 is a fragmentary side elevational view of an improved work rack in accordance with still a further satisfactory embodiment of the present invention.

Another alternative work rack assembly is shown in FIG. 12 which incorporates one or a plurality of vertically stacked rows of pivotally mounted work holder trays 150 extending between side members 152 of a ladder-type box framework of the rack assembly. In the alternative embodiment illustrated, the upper ends of the side members 152 are fixedly secured to a plate 154 which in turn is securely fastened such as by means of bolts 156 to the underside of a transportable supporting member 158. The work rack assembly and the work holder trays 150 thereon are oriented such that the work pieces 160 are in a substantially horizontal position and the rack is not tiltable in a lateral direction as the prior embodiments disclosed. The arrangement as illustrated in FIG. 12 is suitable for processing solid cylindrical work pieces in which no gas discharge problem or drainage problem exists as in the case of cup-shaped and tubular work pieces.

The elongated depending box framework of the work rack assembly is constructed in accordance with the structural arrangement as previously described and illustrated in FIGS. 2 or 8 of the drawings such that an automatic loading and unloading of the work pieces can be effected. The supporting member 158 may be in the form of an arm of a side-arm-type conveying machine as previously described in connection with FIGS. 1 and 7 or a work bar as described in connection with FIGS. 10 and 11. A pivoting movement of the work supporting trays can satisfactorily be achieved in the same manner as previously described in connection with FIGS. 6 and 9.

Referring now to FIGS. 13-15, a structural arrangement is illustrated suitable for use at an unload station for effecting an automatic unloading of the work rack and with minor modification, can also be employed at a separate load station for automatically reloading the work rack. The arrangement as illustrated is particularly adapted for handling the tiltable work rack assemblies as illustrated and described in connection with FIGS. 1 and 7. The fixed rack arrangement of FIG. 12 can also be handled in this unload structure but does not require the actuator for vertically orienting the rack as is required in connection with the tiltable rack structure.

As shown, the unload mechanism is adapted to be mounted on a base 162 of an automatic conveying machine such as the arm-type conveying machine previously described in connection with FIGS. 1 and 7. The unloader comprises a platform 164 consisting of interconnected I-beam members on which a pair of upright channel members 166, 168 are secured in spaced substantially parallel relationship. The channel member 166 is further rigidified by an angle brace 170. A pair of opposed side rails 172 are fixedly secured along the edges of the channel members 166, 168 and are formed with outwardly bent upper end portions 174 to facilitate alignment and guidance of the lower portion of a work rack framework 176 during its descending movement. A pair of end rails 178 are secured to the inner face of the channel member 166 adjacent to the side rails 172 therealong and are formed with outwardly tapered cam portions 180 at the upper ends thereof for receiving and guiding the lower end of the work rack framework during its descending movement. Similarly, a pair of end rails 182 are secured along the inner face edges of the channel member 168 and are formed with outwardly bent upper end portions 184 for camming the lower portion of the rack assembly into alignment.

A platform 186 is supported by means of uprights 188, 190 on which a pad 192 is secured to which the closed end of a double-acting fluid actuated cylinder 194 is pivotally connected by means of a pin 196. A second platform 198 is supported by the upright 190 and the channel member 168 on which a pad 200 is secured to which a lever plate 202 is pivotally secured by means of a pin 204. One corner of the lever plate 202 is connected by means of a pin 206 to a forked fitting 208 secured to the piston rod of the cylinder 194.

The opposite corner of the lever plate 202 as best seen in FIGS. 13 and 14 is provided with a cross member 209 incorporating forwardly projecting ears 210 on which rollers 212 are rotatably mounted at a spacing corresponding substantially to the spacing of the vertical corner rods 214 defining the work rack framework. In addition, a pair of angularly disposed cam plates 216 are affixed to the ears and cross member 208 for engaging and guiding the rack framework into contact with the periphery of the rollers 212.

In accordance with the foregoing arrangement, a work rack as fragmentarily shown in solid lines in FIG. 13 is advanced while in a raised position above the unload mechanism and is angularly tilted with respect to the guide rails therein. Upon attaining that position, as signalled by the central control circuit of the conveying machine, the cylinder 194 is actuated effecting a movement of the alignment actuator including the lever plate 202 from the position as shown in solid lines in FIG. 13 to the position as shown in phantom whereby the cam plates 216 and rollers 212 engage the corner rods 214 of the rack framework causing it to swing from the angular position as shown in solid lines to a substantially vertical position as shown in phantom. In that position, the opposite corner rods 214 of the work rack are disposed against the faces of the end rails 178 retaining the rack in a substantially vertical position. The lift mechanism thereafter is lowered effecting a lowering of the work rack whereby the corner rods 214 thereof are disposed in guided sliding contact with the faces of the side rails 172, end rails 178 and end rails 182 restricting undesirable sideways movement of the work rack. As best seen in FIGS. 14 and 15, a vertically extending cam 218 having a pointed upper end portion is affixed to the inner face of each of the channel members 166 and 168 at substantially the center thereof. As the work rack descends, the cam coacts with the pivotal work tray holders causing them to swing from a work supporting position to a work discharge position in the manner as previously described in connection with FIG. 9. Accordingly, the cylindrical work pieces are sequentially discharged at substantially the same height in response to the descending movement of the work rack and can suitably be removed by a chute or conveyer diagrammatically indicated at 220 in FIG. 15 positioned on each side of the unloader mechanism. The alignment actuator including the lever plate 202 can be retracted at any time after the corner rods of the work rack framework are guidably secured within the guide rails of the unload mechanism. Upon elevation and withdrawal of the work rack assembly from the unload mechanism, the rack again assumes the tilted position as shown fragmentarily in FIG. 13 and the individual work supporting trays pivot back through the action of gravity to a work supporting position. Substantially the same structure can be employed at a succeeding load station but in which the mechanism does not incorporate the vertical cams 218 for tilting the individual work supporting trays. Accordingly, an empty work rack is advanced into a position above a load station and is lowered into a framework similar to that illustrated in FIGS. 13-15 with all of the work supporting trays remaining in the work supporting position. Fresh work pieces are conveyed to each side of the loading mechanism by suitable conveyers such as the conveyers 220 shown in FIG. 15 which are positioned slightly higher in that the sides of the trays are slightly elevated from their discharge position. A suitable transfer device such as a cylinder or ram 222 as schematically shown in FIG. 15, is employed for pushing the work pieces from the conveyer onto the work supporting trays. The foregoing process is sequentially repeated as the work rack is slowly withdrawn from the loading mechanism until the last trays are filled. The work rack can then be transferred through the sequential treating sequence and the processed work pieces unloaded in the manner as previously described.

While it will be apparent that the invention herein disclosed is well calculated to achieve the benefits and advantages as hereinabove set forth, it will be appreciated that the invention is susceptible to modification, variation and change without departing from the spirit thereof.

What is claimed is:

1. In a work conveying machine including a supporting member transportable between a plurality of work stations and movable to and from a raised and a lowered position above the stations, the improvement comprising a work rack having pivotal work holders on said supporting member and transportable thereby, said rack including an elongated frame including spaced side members, a plurality of work holders extending transversely between said side members in vertically spaced relationship, each said work holder comprising a foraminous tray pivotally connected at opposite ends thereof to said side members at a position offset from the center of gravity thereof for normally urging the heavier side of each said tray in a direction toward a first position for supporting a work piece thereon, each said tray pivotal to a second position angularly pivoted from said first position for discharging a work piece therefrom, stops means on said frame for limiting pivoting movement of each said tray beyond said first position, and coacting means at a work station for engaging and pivoting said work holders toward said second position.

2. The improvement as defined in claim 1 in which said stop means comprises a cross member on said frame extending between said side members and disposed in supporting relationship relative to said tray when in said first position.

3. The improvement as defined in claim 1 further including second stop means for limiting movement of each said work holder beyond said second position.

4. The improvement as defined in claim 1 in which said coacting means comprises an actuating member disposed at a work station and engageable with said work holders for effecting pivoting movement thereof to said second position in response to the descending movement of said rack.

5. In a work conveying machine including a supporting member transportable between a plurality of work stations and movable to and from a raised and a lowered position above the stations, the improvement comprising a work rack having pivotal work holders on said supporting member and transportable therby, said rack including an elongated frame including spaced side members, a plurality of work holders pivotally mounted on said frame extending transversely between said side members and arranged in a plurality of vertically extending spaced rows and pivotal to and from a first position for supporting a work piece thereon and a second position for discharging a work piece therefrom, biasing means for normally urging each said work holder toward said first position, and coacting means at a work station comprising an actuating member disposed at the work station and positioned between each said spaced row of work holders for engaging and pivoting said work holders of each row in opposite directions to said second position in response to the descending movement of said rack.

6. The improvement as defined in claim 5 in which each work holder comprises a foraminous tray.

7. The improvement as defined in claim 5 in which each work holder comprises a foraminous tray of an upwardly directed concave transverse configuration for receiving a work piece and pivotally connected at opposite ends thereof to said side members.

8. A work conveying apparatus comprising a framework, a supporting member, transfer means for transporting said supporting member between a plurality of work stations and for elevating and lowering said supporting member between a raised and a lowered position at a work station, a tiltable work rack on said supporting member and transportable thereby, said rack including an elongated frame, a plurality of work holders on said frame for supporting work pieces thereon, pivot means for pivotally suspending said frame from said supporting member at a position offset from the center of gravity of said rack to induce tilting movement of said rack when disposed in one vertical position toward a first tilted position and in a first direction tending to vertically align said pivot means and the center of gravity in which said work holders are angularly inclined from the horizontal, coacting means for engaging said frame when said work rack is in a position vertically spaced from said one position to angularly tilt said rack to a second tilted position in a direction opposite to said first direction, rack receiving means at a work station including guide means for guidably engaging said frame to restrict undesirable swinging movement thereof, said coacting means comprising an actuator member associated with said guide means and movable to and from an engaging position for engaging said rack and tilting said rack to said second tilted position and in alignment with said guide means during the descending movement of said supporting member and a non-engaging position disposed in clearance relationship from said rack.

9. The apparatus as defined in claim 8 in which said guide means further include unload means for dislodging work pieces for said work holders to unload said rack in response to the descending movement of said supporting member.

10. The apparatus as defined in claim 8 further including load means adjacent to said guide means for loading work pieces on said work holders while said rack is guidably supported in said guide means.

11. The apparatus as defined in claim 8 in which said work holders are disposed in a substantially horizontal position when said rack is in said second titled position to facilitate a loading and unloading of the work pieces thereon.

* * * * *